United States Patent
Lindskog et al.

(10) Patent No.: US 6,370,572 B1
(45) Date of Patent: Apr. 9, 2002

(54) PERFORMANCE MANAGEMENT AND CONTROL SYSTEM FOR A DISTRIBUTED COMMUNICATIONS NETWORK

(75) Inventors: Peter Lindskog, Östergötland (SE); Adrian Newcombe, Dublin (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/148,394

(22) Filed: Sep. 4, 1998

(51) Int. Cl.[7] .............................................. G06F 13/00
(52) U.S. Cl. ...................................................... 709/223
(58) Field of Search .................. 709/200, 201, 709/223, 227, 229, 238, 243, 244

(56) References Cited

FOREIGN PATENT DOCUMENTS

| EP | 0 496 061 A2 | 7/1992 |
|---|---|---|
| WO | WO 97/07638 | 2/1997 |
| WO | WO 98/05129 | 2/1998 |
| WO | WO 98/57504 | 12/1998 |

OTHER PUBLICATIONS

PCT International Search Report Form PCT/ISA/210 dated Jul. 24, 2000.
PCT International Search Report, May 17, 1999, PCT/RE 101741 US.
Makoto Takano and Katsumi Fujita, "Multilevel Network Management by Means of System Identification", IEICE Transactions on Communications, vol. E78–B1, No. 1, Jan. 1, 1995, pp. 47–53, XP000495103.

*Primary Examiner*—Robert B. Harrell
(74) *Attorney, Agent, or Firm*—Jenkens & Gilchrist, P.C.

(57) ABSTRACT

A distributed communications network management and control system is disclosed, which includes a real time control system composed of a plurality of control agents. The control agents receive real time performance information associated with the distributed communications network from a plurality of performance agents, analyze the real time performance information, and in due time, output control commands that control the performance of the distributed communications network based on the real time performance data received.

42 Claims, 3 Drawing Sheets

PERFORMANCE MANAGEMENT AND CONTROL SYSTEM FOR A DISTRIBUTED COMMUNICATIONS NETWORK

RELATED APPLICATIONS

This application is related by subject matter to commonly-assigned U.S. patent application Ser. No. 09/097,413 filed Jun. 16, 1998, which is incorporated by reference herein in its entirety.

BACKGROUND OF THE INVENTION

1. Technical Field of the Invention

The present invention relates in general to the communications field and, in particular, to a system and method for improving the performance management of a distributed communications network.

2. Description of Related Art

The tasks of managing and controlling the performance of distributed communications networks (e.g., distributed data networks or distributed telecommunications networks) are becoming increasingly complex due to a number of crucial factors, such as, for example, the increased complexity, dynamism and diversity of the network technologies, the spread of advanced services with very distinct requirements (e.g., live video, file transfers, etc.), and the heightened expectations of the users being served. Other crucial factors that impact network complexity are the progressive deregulation of the telecommunications industry, and the highly competitive market that has emerged as a result.

In order to survive in such an environment, a distributed communications network operator must manage the network so that its utilization is maximized (i.e., ensure a maximum return on the investment), while ensuring that all offered services perform within expected bounds. In order to perform such tasks, the operator's personnel need certain support tools that help them to manage the tasks with their complexities. In particular, certain distributed, dynamically changing networks, such as, for example, the next generation Internet and so-called third generation mobile communication networks will require a level of operational support that is not provided by today's support systems.

Operation and Support Systems (OSS) typically function to perform routine support tasks in data communications and telecommunications systems, such as, for example, traffic measurements, network supervision and performance management, analyses, fault diagnoses, administrative tasks, etc. The current approach used for network performance management in the OSS industry typically involves a number of applications residing on a software platform. The software platform usually supports separate applications for monitoring network performance information, managing alarm conditions, and handling of common functions in order to initiate management operations for network resources. Normally, these applications are not integrated to a great extent, other than that they share the same platform facilities. Consequently, it is the operator who has to correlate the performance and alarm information, and where necessary, decide what actions are appropriate to take with regard to improving network performance.

As such, most of the support systems involved are centralized in a single, monolithic management center, or in some cases, distributed or spread across a relatively small number of geographically distinct management centers. In some of the distributed system cases, the main reason for the distribution is the distributed nature of the responsibilities in the corporate organizations involved.

Currently, in a typical telecommunication system, the network element of the system gathers statistics about the traffic it is handling over a five or fifteen minute interval. The network element then makes this information available to the system as an output file, or stores it locally for later retrieval. As such, two of the original motives for structuring the telecommunication system performance measurement activities in this way were to minimize the sheer volume of information generated, and reduce the network element's processor load. Typically, the performance information is retrieved by a network element's management system, and stored in a database from which performance reports can be generated, either periodically or on demand.

A relatively small subset of management/control functions are automated in today's telecommunications networks. These functions are almost exclusively implemented in the network elements, and their scope is typically confined to the specific network element involved. An example of such a management/control function is "overload control," which attempts to regulate the load on a network element so that the element's performance is maintained within acceptable bounds.

Nevertheless, there are a number of problems that exist with the current state of the art performance management solutions. However, as described below, the problems particularly relevant to the present invention are related to management/control complexity, timing and centralization. For example, telecommunication networks are becoming increasingly complex to manage in terms of their scale, the diversity of the networks and services they provide, and the resulting voluminous amount of information that must be handled by the management system. In order to address these complexities, certain semi-automated and automated management solutions will be needed to support a network operator's staff. However, such support capabilities actually do not exist in the management solutions provided today.

Specifically, today's performance management systems collect network performance measurement information at fixed intervals (granularities) of 5 minutes, 15 minutes, or 1 hour. However, implementation at such fixed intervals effectively introduces an inherent latency or delay in the availability of the performance information. Consequently, these delays effectively limit the ability of network managers to analyze the performance of their networks. Clearly, in operating dynamic telecommunication networks such as cellular networks, Internets, and broadband multi-media networks, these delays in identifying and resolving network performance problems are unacceptable. Furthermore, as the network management/control systems become increasingly automated, such delays in the delivery of performance measurement information, and the coarse granularity of the measurements themselves, will become increasingly unacceptable. Instead, the measurement and control intervals used should be dictated by the timing requirements of the problem domain, rather than by the solutions the network elements provide today.

Today's telecommunication network management systems are deployed in a relatively small number of locations in the network. In other words, the management functions are centralized in a small number of network nodes. This approach works to a certain extent in today's large telecommunication networks, because the network functions are also centralized in very large and costly network elements. As mentioned earlier, the control algorithms (e.g., overload control) that exist today are limited in scope to a single network element. However, in the distributed processing networks of the future, this single network element approach will not be acceptable because the distribution of service logic across, and interdependencies between, the distributed network elements will require control solutions that can span the distributed nodes.

SUMMARY OF THE INVENTION

In accordance with the preferred embodiment of the present invention, a distributed communications network management and control system includes a real time control system, which is composed of a plurality of control agents. The control agents receive real time performance information associated with the distributed communications network from a plurality of performance agents, analyze the real time performance information, and in due time, output control commands that control the performance of the distributed communications network based on the real time performance data received.

An important technical advantage of the present invention is that it provides a system that supports the abstraction of managed network information to support views that are appropriate for solving distinct control problems.

Another important technical advantage of the present invention is that it provides a system that is both flexible and scalable, with the possibility of configuring the system to suit the needs of individual operators, the size of the particular networks, and/or the particular control problems to be deployed.

Yet another important technical advantage of the present invention is that it provides a distributed system, which allows both the deployment of control logic where it is most needed, and inter-communication between distributed components.

Still another important technical advantage of the present invention is that it provides a system that is hierarchical, and as such, it supports the abstraction of control information, or a "management by delegation" model of control.

Still another important technical advantage of the present invention is that it provides a system that supports encapsulation of detailed control logic into lower level control agents, which hide the details behind higher level goal driven control interfaces.

Yet another important technical advantage of the present invention is that it provides a system that enables the expression and handling of real time constraints on control activities, in order to realize real time control.

Still another important technical advantage of the present invention is that it provides a system that enables the implementation of control strategies which are predicated on the certainty of the source data and use this certainty as a parameter to decide on the nature of the control actions to be taken.

Still another important technical advantage of the present invention is that it provides a system that enables the synchronization of control actions across a distributed control system, and reasoning about events in physically separated parts of the managed network.

Yet another important technical advantage of the present invention is that it provides improved Base Station Controller (BSC) overload protection control over that of prior systems.

Still another important technical advantage of the present invention is that it provides a hierarchical control approach which is the decomposition of control responsibilities into cell, region, or sub-network domains, thereby allowing access control on the most appropriate level.

Still another important technical advantage of the present invention is that it provides a system that can avoid forced restarts of the managed resources (especially a BSC central processor) with a high probability, because the restart deadlines are taken into account and reacted upon in the control logic.

Yet another important technical advantage of the present invention is that it provides control schemes that involve mechanisms for reducing the repetitive overload periods (e.g., bar-unbar oscillations) by including hysteresis and coordinated unbarring of access classes.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–6 of the drawings, like numerals being used for like and corresponding parts of the various drawings.

Essentially, in accordance with the present invention, a distributed communications network management and control system includes a real time control system, which is composed of a plurality of control agents. The control agents receive real time performance information associated with the distributed communications network from a plurality of performance agents, analyze the real time performance information, and in due time, output control commands that control the performance of the distributed communications network based on the real time performance data received.

Figure 1:
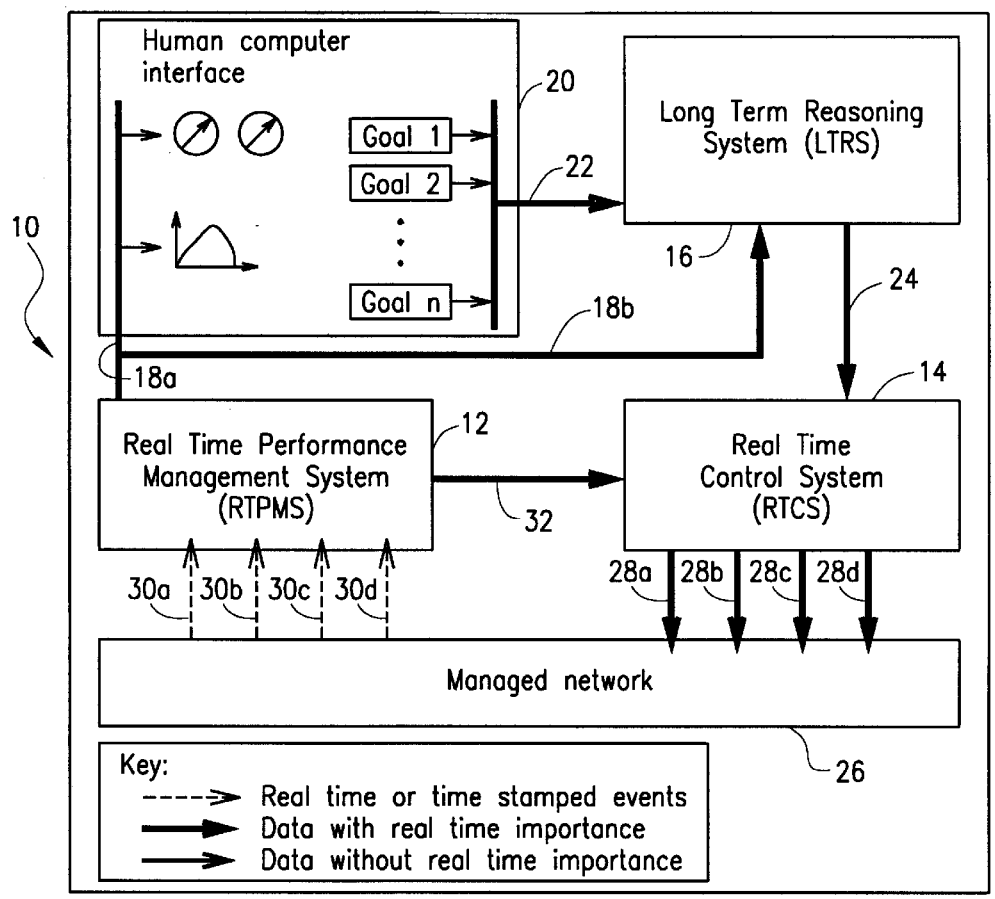
FIG. 1 is a block diagram of an exemplary distributed communications network management and control system, which can be used to implement a preferred embodiment of the present invention.

Specifically, FIG. 1 is a block diagram of an exemplary distributed communications network management and control system 10, which can be used to implement a preferred embodiment of the present invention. As shown, the exemplary system 10 includes a Real Time Performance Measurement System (RTPMS) 12, a Real Time Control System (RTCS) 14, and a Long Term Reasoning System (LTRS) 16. For this exemplary embodiment, an output of the RTPMS 12 couples performance measurement information via a plurality of data links (e.g., several data links in this distributed system) 18a to a human computer interface 20, and via a plurality of data links 18b to the LTRS 16. The data links 18b convey data to the LTRS 16 that has no real time importance. An output of the human computer interface 20 is coupled to the LTRS 16 via a plurality of data links 22, and an output of the LTRS is coupled to the RTCS 14 via a plurality of data links 24. Notably, as illustrated by the lighter shade arrow, the data links 24 convey data to the RTCS 14 that has no real time importance.

The telecommunications network 26 to be managed by the network management and control system 10 is coupled to a plurality of outputs from the RTCS 14 via data links 28a–d (each of which comprises a plurality of data links), and to a plurality of inputs to the RTPMS 12 via lines 30a–d. An output of the RTPMS 12 is coupled to the RTCS 14 via a plurality of data links 32.

For this exemplary embodiment, the RTPMS 12 functions primarily to measure the performance of the managed network 26 on a real time basis. In other words, the RTPMS 12 measures the required performance indicators for the managed resources in the network 26, and provides the results of the measurements to the requester within the required time frame. Notably, this ability to provide the results in the required time frame is very important in this context, because in automatic control terms, it is more than just the reported information that is important. It is the time at which the information is available which is just as important, so that proper control actions can be taken in due time. As such, the time scales involved can vary from seconds up to several hours. Additionally, the managed network 26 is a distributed system. Consequently, if a visualization of the current performance of the network 26 is to be timely provided, then the relevant information must be made available to the visualization system (e.g., interface 20) at the time that the view is to be updated.

The RTPMS 12 also functions to provide a subscription interface to external systems, so that the external systems can subscribe to receive the network performance information. The RTPMS 12 can accept or reject such a subscription, based on its ability to meet the constraints described in the current subscription and/or existing subscriptions. Once such a subscription is accepted, the RTPMS 12 sends the performance data associated with the subscription to the subscribing system in the form of an event. See the above-cited U.S. patent application Ser. No. 09/097,413 for a more detailed description of the RTPMS 12 and its operation.

For this embodiment, the LTRS 16 functions as a control system, which monitors how well the network 26 is being controlled by the RTCS 14 (as described in more detail below). The LTRS 16 subscribes to the relevant performance information from the RTPMS 12, and on the basis of this information, evaluates how well the network 26 is being controlled. Where necessary, the LTRS 16 modifies the control policy of the RTCS 14, in order to improve how the network is being controlled. Notably, for this embodiment, the LTRS 16 does not operate in real time, but rather on a much longer time scale compared to that of the RTCS. As such, the LTRS 16 can be realized as an automated "intelligent" system, a semi-automated decision support system involving a human expert, or a person manually performing the tasks involved. One suitable embodiment of the LTRS 16 is described in PCT Patent Publication No. WO 97 07638.

The human computer interface 20 is essentially a visualization system, which is a collective term for a number of user interface systems relating to the management and control of a network. An example of such a system includes a device for real time visualization of the network status, or a user interface supporting a human operator in the LTRS 16.

The RTCS 14 shown in FIG. 1 illustrates a preferred embodiment of the present invention. Essentially, the RTCS 14 is responsible for controlling the network 26 so that it performs within acceptable bounds. The RTCS 14 is also responsible for optimizing the usage of the network's managed resources. In order to meet this responsibility, the RTCS subscribes to the real time performance information that it requires from the RTPMS 12, and specifies the timing constraints on this information. Upon receiving the real time performance information from the RTPMS 12, the RTCS 14 analyzes the information and, where necessary, takes remedial action (via data links 28a–d) to improve the network's performance.

The RTCS 14 controls the performance of the network 26 in real time, subject to a set of goals specified in a predetermined control policy. This control policy can be provided and updated by the LTRS 16. This separation of "duties" is enforced in order to reduce the complexity of the RTCS 14 (and thus the computational load) so that it can operate successfully in real time.

At this point, it would be useful to define certain relevant concepts relating to real time systems. In general, there are three types of real time systems which are categorized by the deadlines required. First, a "hard" real time system is one in which it is critical that the system responds to its inputs within the specified deadlines. The consequences of missing a hard deadline are typically catastrophic. Second, a "soft" real time system is one in which the response times of the system are important, but the system will still function if the specified deadlines are missed. Consequently, a soft deadline will often have a few characteristics that describe the deadline. For example, these characteristics could include the deadline itself, the upper bound on the probability of missing a deadline, or an upper bound on the lateness of the delivery. Third, a "firm" real time system is one in which the deadlines can be missed, but where there is no point in delivering late. The firm real time deadline is related to the soft deadline, except that in the case of a firm deadline there is no notion of a late delivery (i.e., if the firm deadline is missed, then the task is aborted). Consequently, the characteristics of a firm deadline are the deadline itself and an upper bound on the probability of missing the deadline.

Returning to FIG. 1, the RTCS 14 is composed of one or more Control Agents (CAs). These CAs are assigned responsibilities for the real time control of a group of managed network resources called a "domain". The CAs can be arranged in a hierarchy, wherein higher level CAs have a wider area of responsibility and control the objectives of subordinate CAs, which in turn, control the actual resources. A detailed description of these CAs and an example of their hierarchical arrangements are provided below.

The RTCS 14 is structured in accordance with the following principles:

Abstraction—The RTCS supports different views of the network resources and associated control logic, so that different control applications (or components of a single application) can be provided with a view which is at the correct level of abstraction for the particular control problem to be solved.

Distribution—Telecommunication networks are by definition distributed systems, with the level of distribution depending on a number of factors, the least of which is network technology. The RTCS 14 is a distributed control system in which real time controllers can be placed in close proximity to the network resources they are responsible for, but the RTCS can also interact with other controllers not co-located with it. The control logic resides in the locations where it is needed. A CA is a unit of distribution within the RTCS 14. As mentioned earlier, a CA is responsible for the control of a group of managed resources (e.g., a domain). In a hierarchical arrangement, such a domain can also contain subordinate CAs.

Hierarchical—The agents in the RTCS can be arranged in a hierarchy, in which lower level CAs have local detailed knowledge about the managed resources and their control. Higher level CAs have more global knowledge (i.e., a higher level CA spans the domains of a plurality of lower level agents), but at a higher level of abstraction. In other words, as one moves up in the hierarchy, the level of detailed knowledge decreases, but the extent and abstraction of knowledge increase.

Management by delegation and encapsulation of control logic—The CAs in the RTCS 14 use a management-by-delegation paradigm for the exchange of control actions (or control signals). In other words, the superior CAs delegate to their subordinate CAs to perform control tasks or define the control objectives for the subordinate domains. This model allows the CAs to encapsulate the details of the control logic for its particular resources. As such, the model also allows higher level CAs to control resources of different types, without knowing the details of how this task is actually carried out.

Timing—The RTCS 14 must be able to control the network subject to the timing constraints applicable for the control problem being solved. The timing requirements of different applications will vary, but the RTCS provides a means for expressing this variability, and it enables control applications to handle these constraints and reason about the timeliness of control signals or source data.

Handling of uncertainty—In many cases, control decisions will be made based on data streams which are not guaranteed to be 100% reliable, or they are statistically derived and, therefore, have some margin of error built in. Depending on the perceived certainty of source data, CAs may temper the actions they take upon the managed network 26. For example, if specific data is uncertain, the CA may take a more cautious approach than if the data had a high level of certainty associated with it.

"Certainty" is a quantity which is specific to the control domain in which it is being used. Therefore, the RTPMS 12 may not always be in a position to estimate the certainty of measurement information, but it provides the control system with the necessary data required to make this estimate (e.g., the number of samples used to compute a performance indicator).

Synchronization—The real time framework upon which the RTCS 14 runs, which supports the issuance of control actions that are synchronized in time. This functioning is possible because all CAs share the same view of time. The clock synchronization is achieved, for example, through the use of a Network Time Protocol (NTP) on the underlying computing platform.

Interactions between CAs are performed by means of control commands, which specify the targets or constraints that a particular CA must meet, and set the goals of the control algorithms. The control commands are set by superior CAs in the hierarchy, or by a human operator through a graphical user interface. In the latter case, the person is in effect a superior CA.

An example of a control command specification is a probability of loss target of 0.02, which is an upper bound on the blocking probability for the domain controlled by the CA. The meaning of the control commands is decided by the control logic. In the example given above, it is the control logic which understands that the control command specifies an upper bound. This approach is consistent with the present invention's approach of encapsulating the control decision-making within the CAs.

The RTCS 14 addresses real time control functions. Consequently, the timing constraints associated with the control functions also need to be communicated. Two exemplary methods for achieving these tasks are as follows: (1) Implicit timing—The timing constraints are encoded in the control logic itself, and when control objectives are modified, the changes are subject to the implicit constraints. This approach is suitable for situations where there are clearly defined and constant timing constraints on the control algorithms. For example, this method would apply for a GSM BSC restart period of three minutes in an overload control application (to be described in detail below). (2) Explicit timing—In this case, the timing constraints are explicitly stated in the control commands sent by the superior CA. The CA must then attempt to meet the control target subject to these timing constraints. Typically, such a constraint would be a deadline which the new control target should meet. Explicit constraints are used where the timing constraints in control algorithms vary or are not well defined.

As such, the control problems to be dealt with by the RTCS 14 do not fall into a single category. Consequently, both of the above-described alternatives are used in the RTCS. Where timing constraints are used, it is also important to indicate the nature of the constraints in terms of the categorization of real time systems defined earlier (i.e., whether the behavior is hard, soft, or firm).

Figure 2:
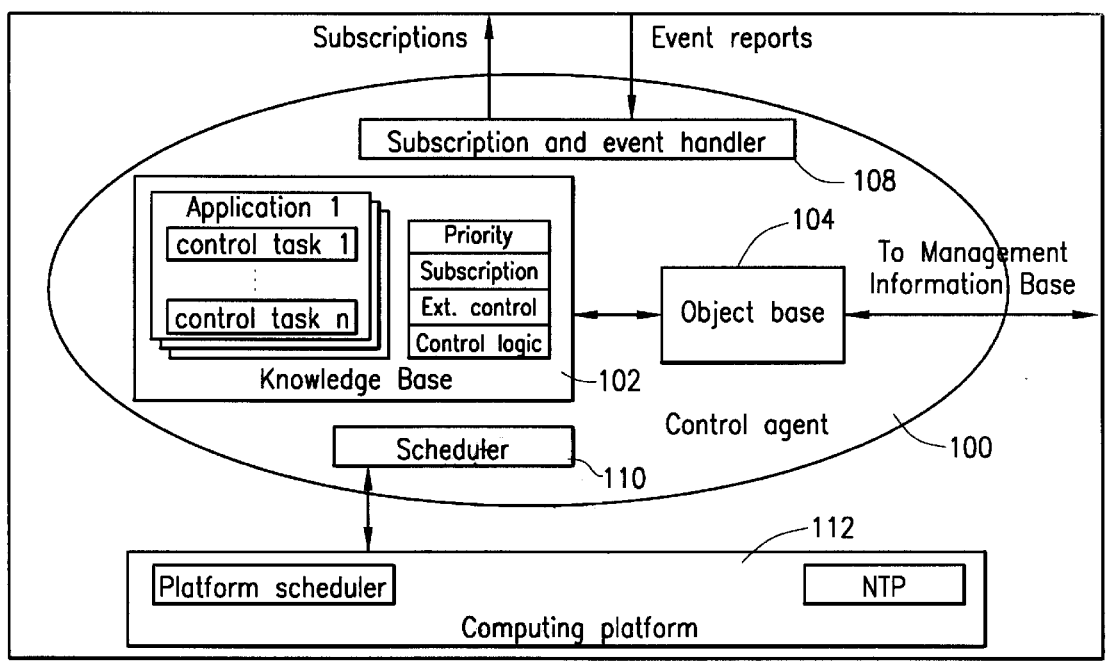
FIG. 2 is a block diagram that illustrates the components of a Control Agent and their interrelationships, which can be utilized in and/or by the RTCS 14 shown in FIG. 1, in accordance with a preferred embodiment of the present invention.

FIG. 2 is a block diagram that illustrates the components of a CA (100) and their interrelationships, which can be utilized in and/or by the RTCS 14 shown in FIG. 1, in accordance with a preferred embodiment of the present invention. For this exemplary embodiment, a CA 100 includes a Knowledge Base (KB) 102, which is preferably a database that contains descriptions of the different control applications performed by the CA. The application-specific control functions are in turn specified in terms of one or more control tasks (1–n), each of which is given a priority (specifying the relative importance of the task in comparison with the other tasks). Associated with a control task is information about the data needed (e.g., what to subscribe to, with what periodicity, etc.), and to which external control commands to react. A control task (1–n) also contains the control logic that realizes the actual control algorithms. This logic may be encoded, for example, in terms of rules, neural networks, cases, or some other mechanisms used for representing knowledge which are appropriate for the considered class of control problems. An example of a control task involving a state transition diagram and a number of associated rules is described in more detail below.

The exemplary CA 100 also includes an object base 104, which is preferably a database containing information that the CA maintains about the managed network 26, its state, and its performance. The object base 104 includes network configuration and state information which is read from a Management Information Base (MIB) (not shown) while network performance is received from the RTPMS 12.

A subscription and event handler 108 is also included, which is responsible for generating subscriptions for the RTPMS 12, and receiving event information from the RTPMS in return. The parameters of the subscriptions are defined by the information needs of the control algorithms and the associated timing constraints. In addition to receiving performance data from the RTPMS 12, the subscription and event handler 108 also receives control commands from higher level CAs and, possibly, directly from the network operator. The subscription and event handler 108 can also handle any control command generated by the LTRS 16.

The exemplary CA 100 also includes a scheduling component 110, which is responsible for the scheduling of real time functions within the CA, so that timing constraints on these functions are met. The scheduling component (110) in each CA must interact with the scheduling facilities (platform scheduler)of the underlying computing platform 112, in order to achieve this function. This ability is particularly important in the case where a CA shares a computing platform with other CAs or with other entities (e.g., a PA from the RTPMS 12).

In accordance with the teachings of the present invention, a management and control architecture is provided that can be used to handle numerous problems arising in the telecommunications field. However, in accordance with the preferred embodiment, the management and control architecture described herein is especially suitable for cellular systems, where the mobility places certain demands on moving or adjusting the cellular network's resources in real time, so that these resources can be utilized in the best possible way. Typical of such cellular application domains are: (1) Network overload protection control—The objective with approaches in this category is to protect various network resources from overload caused by too high traffic levels being offered. As such, costly restart periods for the network resources can be avoided, and a higher network availability can be obtained. (2) Radio network configuration—For approaches in this category, the basic idea is to monitor certain traffic indicators, and based on those indicators, adaptively attempt to move resources to regions where they are most needed. Typically, such functions include the action of changing cell sizes (usually by handover parameter settings in order to force traffic into or away from certain cells), as well as adaptive channel frequency allocation. (3) Adaptive "high-level" control—Cellular systems are often equipped with power control and admission control schemes. Due to the fast response needed (on the order of milliseconds for power control), control decisions of this kind are made locally in the respective network elements. While the present invention's architecture described herein is not designed primarily for such short response times, it can still be used to monitor the effects of these low-level controllers on the whole network or a part of the network, and if needed, parameters or even policies of the low-level controllers can be changed.

Figure 3:
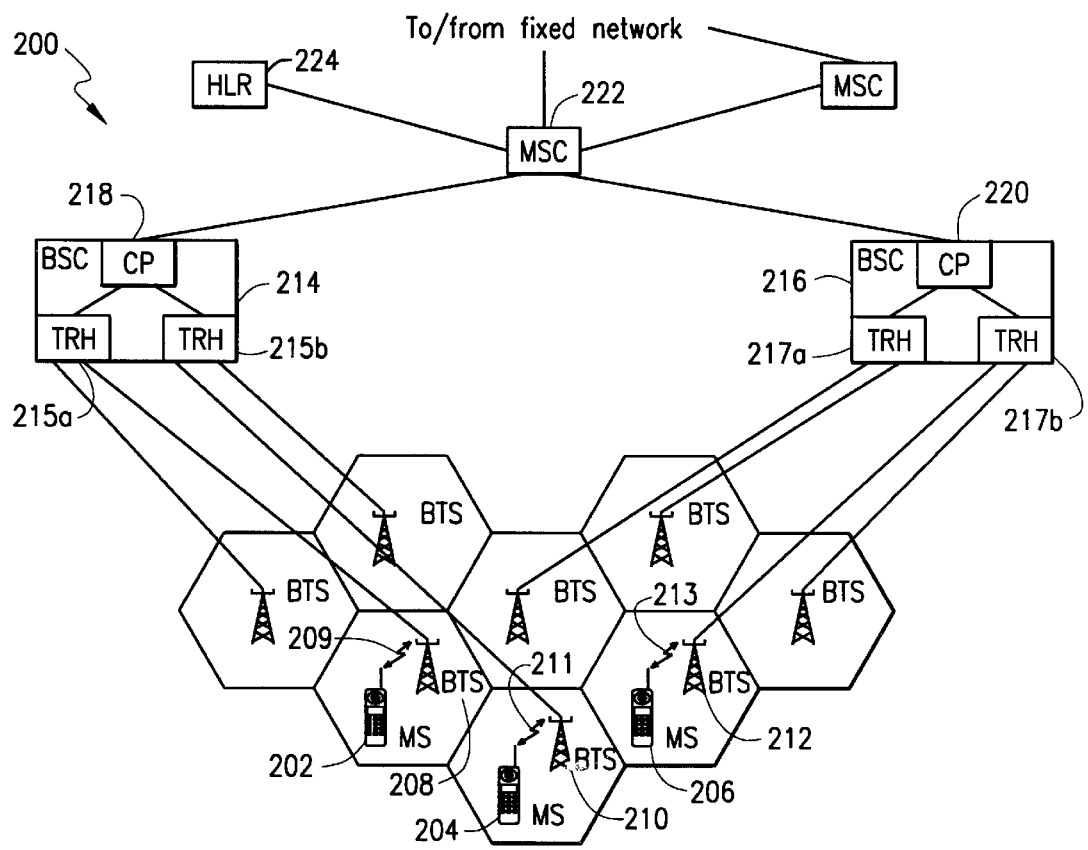
FIG. 3 is a diagram that illustrates an exemplary cellular system that can be used to implement a preferred embodiment of the present invention.

FIG. 3 is a diagram that illustrates an exemplary cellular system 200 that can be used to implement a preferred embodiment of the present invention. For this embodiment, the cellular system 200 depicted is the Global System for Mobile Communications (GSM), but the present invention is not intended to be so limited. For example, the present invention can be applied with respect to any existing or future cellular standard, such as for the Digital-Advanced Mobile Phone System (D-AMPS), Personal Digital Cellular (PDC) system, Personal Communications System (PCS), Wideband-Code Division Multiple Access (WCDMA) systems, etc. Also, for this embodiment, a solution to the network overload protection control problem is described, but the present invention is not intended to be so limited and can apply, for example, to solving various radio network configuration and adaptive high-level control problems as well.

Referring to the exemplary cellular system 200 shown in FIG. 3, the system includes a plurality of mobile stations (MSs) exemplified by MS 202, 204 and 206. Each MS is connected to a Base Transceiver Station (BTS) 208, 210 and 212 via a respective radio air interface 209, 211 and 213. For the GSM, the radio air interface is based on a Time Division Multiple Access (TDMA) scheme. Each BTS 208, 210, 212, etc., handles traffic in a respective cell, which is defined by that BTS involved. The BTSs are further connected to a particular BSC 214 or 216. Each BSC includes a plurality of Transceiver Handlers (TRHs) 215a and 215b, and 217a and 217b, and a main central processor (CP) 218 and 220, respectively. In turn, the BSCs communicate with a Mobile Services Switching Center (MSC) 222, which is connected to a fixed network (not shown) in some conventional way. The fixed network can be, for example, a Public Switched Telephone Network (PSTN), Integrated Services Digital Network (ISDN), or an Internet. The cellular network also includes a Home Location Register (HLR) 224, which is accessible from the network's MSCs.

In the network configuration shown in FIG. 3, overload can be caused in a number of different ways, and in principle, in any of the network's elements. For simplicity, the description of the preferred embodiment is limited primarily to the sub-network governed by one BSC and its underlying resources (CP, TRHs, BTSs, etc.). However, the management and control principles described herein with respect to the preferred embodiment can be extended to include the entire network, additionally involving the MSCs and the HLR.

As such, overload in a BSC or any of its managed resources typically occurs when too many MSs try to access the network in a relatively short time period (often less than a minute). This situation can happen when there are a large number of "simultaneous" attempted calls (e.g., occurring after a major sports event or an accident on a highway). In fact, a large number of simultaneous access attempts, along with a number of international roaming attempts, caused the hard-to-resolve BSC overload problem encountered in Berlin, Germany in September 1993. This overload situation can also occur when a large number of MSs attempt to register in the network at roughly the same time. One possible occurrence of this mass registration scenario was when an operator with one 900 MHZ and one 1800 MHZ GSM network configured a system to allow roaming between these networks. After one of the networks failed, some 30,000 MSs attempted to register in the other network within less than a minute's time.

As such, the latter (registration) situation's type of short and excessive transients are likely to be more common in the future, when operators sign special roaming agreements which state that their respective network should take over traffic from a competitor in case of a system failure. However, it is highly desirable that the BSC overload management and control system employed is capable of coping with both of the above-described overload situations.

At this point, it is useful to describe why a severe BSC overload situation is so difficult to resolve with today's GSM overload protection schemes. Up to the point when an overload occurs, normally there are rather few re-transmissions, with those generated being due primarily to lost messages in the radio air interface. When an overload occurs, the subsequent access request messages are placed in a queue. Consequently, the anticipated response from the BSC will be delayed. If the BSC does not respond within a predefined time period (250 ms in the GSM), then the MS repeats its access request (up to a maximum number of allowed times) until a valid response is obtained. However, these repetitive access requests add to the load, and consequently, it becomes more difficult to get responses in due time. This increase in the number of access messages is highly non-linear, and as such, very difficult to completely analyze.

If the overload condition continues for a certain time period (three minutes for a GSM BSC's CP), the BSC's components are restarted. During this period, the BSC's underlying domain cannot be properly served. However, a restart does not necessarily resolve the overload problem, because once the resource is again available, the MSs will again attempt to gain access which again can lead to overload, and thus another restart. As it turns out, repetitive restarts of this kind are relatively common.

Notably, in light of the above-described overload scenario, some important points can be made. For example, a certain BSC manufactured by Ericsson Telecom is based upon the Ericsson AXE Digital Switching System technology and equipped with a Load Supervisor (LOAS) whose purpose is to protect the BSC's CP from overload. The LOAS accomplishes this function by providing the CP with the amount of work which the LOAS knows the CP can handle. While the LOAS's type of functionality can help to get rid of very short and moderate overload transients, generally the LOAS is not useful for resolving more severe overload situations. The main reason for this lack of capability is that the LOAS contains no powerful means for reducing the number of access attempts made.

Furthermore, today's operations support systems typically operate in fifteen or even five minute intervals. This reporting granularity is so crude that a restart of a BSC's CP may very well occur before the problem is detected by such a support system. However, even if an overload condition is detected within the deadline, it should be resolved (via appropriate control actions) within that time. The short restart time scenarios also rule out using a manual solution. Clearly, there is no way for an operator to investigate the load situation in all affected cells (e.g, each BSC can be connected to hundreds of BTSs), settle upon the appropriate control actions, and realize them within the BSC's CP restart deadline. Moreover, it is highly desirable to avoid restarts, at least of the BSC's CP, and still offer network access to as many MSs as possible. These goals are very difficult, if not impossible, to assess without a real time-based management and control system.

The basic idea behind BSC overload protection control is to monitor the performance of one BSC and its underlying resources, and in the case of an overload, attempt to reduce the traffic by changing the access pattern of the corresponding MSs. This function can be accomplished to various degrees in principally three ways: (1) Indirect control—This is the situation when performance indicators are used by the control system as a basis for computing the cost of accessing the network. The cost information is passed on to the MSs in real time, but no changes in the network's parameters are ordered. Instead, it is hoped that the high cost of accessing the network in the case of an overload leads to fewer access attempts. Although it is a relatively simple technique, this approach does not guarantee that the overload is handled within the restart deadline. Another problem with this approach is that only accesses related to real calls can be prevented, because the mobile user has no control over the sending of registration messages (i.e., the method is not applicable for all possible overload situations). (2) Resource allocation control—The main idea in this case is to move or adapt the network's resources so that they are utilized in the best possible way. However, in today's cellular systems, it is only possible to make rather small adaptations, which will not be enough to handle a mass registration scenario. (3) Direct access control—With this approach, control commands are sent to the MSs from the management and control system. These control commands define the currently granted access privileges of the MSs. As such, there are three different ways of controlling the mobiles' access behavior in a specific cell, such as (1) by specifying the maximum allowed number of access retries, (2) by specifying the minimum time between consecutive accesses, and (3) by barring/unbarring any of the 10 access classes into which the (GSM) MSs are divided. The bar/unbar approach is best suited for ensuring that an overload situation can be handled, because (in principle) it allows the removal of all traffic from a cell. The other two approaches are preferably used as a complement to the third approach in order to optimize (fine tune) the MSs' access behavior.

Figure 4:
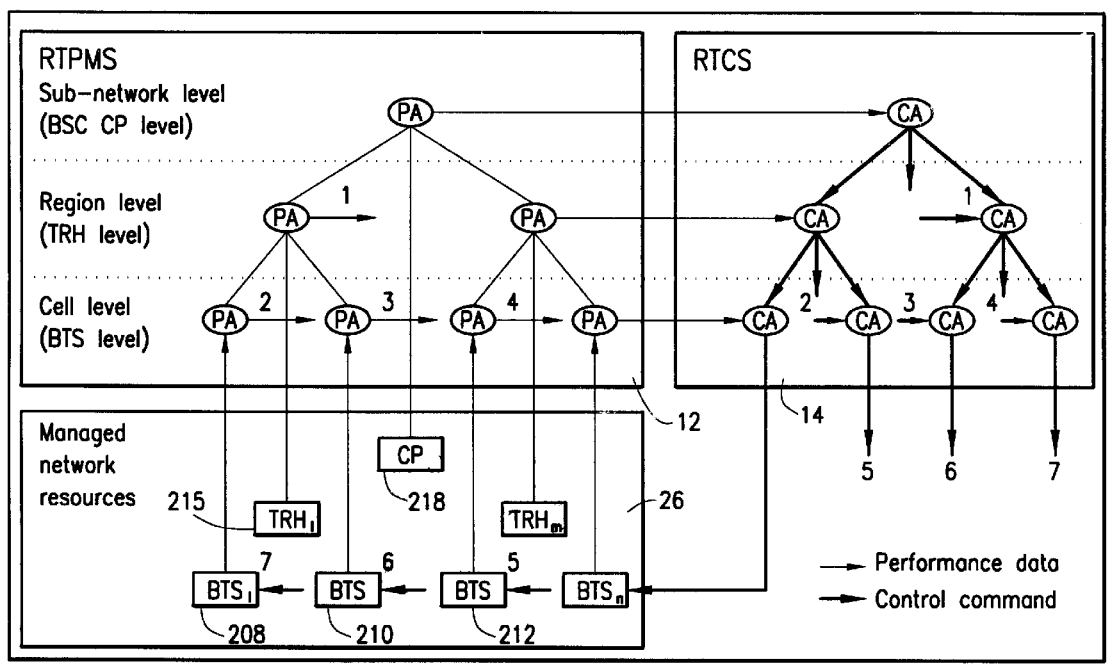
FIG. 4 is a diagram which illustrates an architecture that can be applied to realize a pure bar/unbar BSC overload protection control scheme, in accordance with the preferred embodiment of the present invention.
Figure 5:
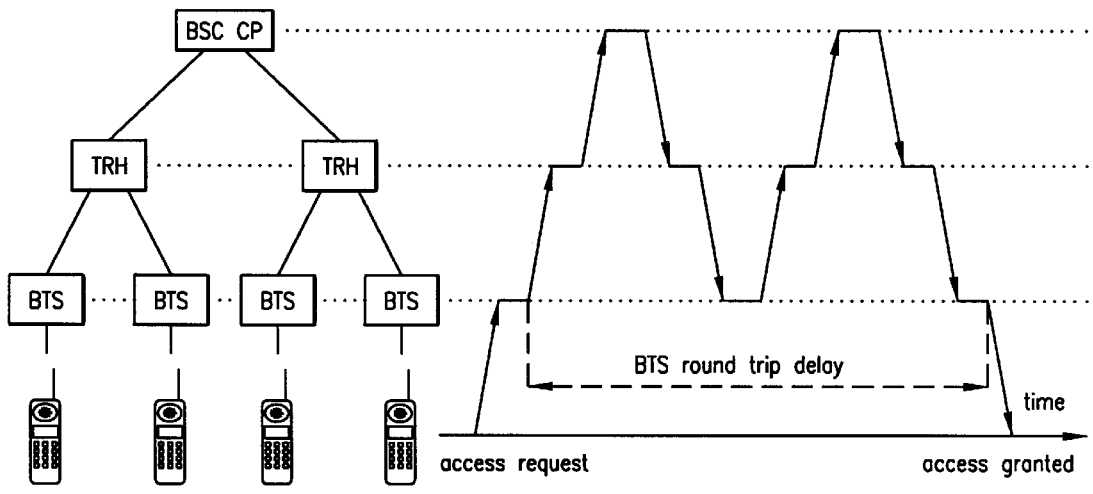
FIG. 5 is a diagram that illustrates an example of a BTS round trip delay which can be measured, in accordance with the preferred embodiment of the present invention.

In accordance with the preferred embodiment of the present invention, an architecture is applied to realize a pure bar/unbar BSC overload control scheme. FIG. 4 is a diagram that illustrates such an architecture, which is an agent (PA and CA) configuration for BSC overload protection control. First, it should be noted that the agent configuration shown in FIG. 4 can be used for any of the above-described control approaches. Second, by adding another level of abstraction, and introducing equally as many hierarchies of the type shown in FIG. 4 as there are BSCs, the scope of the present invention can be expanded to provide an arrangement suited for network (MSC) level overload control.

Referring to FIG. 4, from the CAs' perspective (in the RTCS 14), the basic requirements imposed on the performance measuring system (RTPMS 12) are that it should be subscription-based and able to deliver the application-specific performance indicators in real time. The Performance Agents (PAs) described in the above-cited U.S. patent application Ser. No. 09/097,413 are ideally suited for this function, because they share many of the desired features (e.g., abstraction, distribution, hierarchical design, etc.) that are so fundamental for the framework embodied by the present invention.

The resources to be monitored in the case of a BSC overload are the BSC's CP (218), its TRHs 215a–b, etc. (each of which corresponds to a region), and all of the underlying BTSs 208, 210, 212, etc. (each of which corresponds to a cell or a small group of cells served by the BTS involved) This is precisely the view provided by the PA hierarchy shown in the RTPMS 12 in FIG. 4. In this case, note that the number of region level PAs (2) is equal to the number of TRHs in the BSC, and that the number of cell level PAs (4) is the same as the number of BTSs connected to that BSC. As such, this arrangement effectively enables control of a cell, region, and at the sub-network level (i.e., the arrangement shown advantageously allows control over the level where it is deemed to be most effective).

The detection of overload on each level can be based on measurements directly from the managed resources (in network 26). In the region and sub-network cases, the detection of overload can also be based on lower level performance indicators subscribed to from lower level PAs. A general mathematical description of the load of network resource I on the level 1 can be expressed as:

$$\text{load}_i^l = f(M_i^l, Q_{i,\text{input}}^l, Q_{i,\text{output}}^l, L_i^l, D), \quad (1)$$

where 1 is equal to a cell, region or sub-network and involves the following resource measurements: $M_i^l$, or the number of access requests obtained by resource I on level 1 during some predetermined time period; $Q_{i,input}^{1}$, or the length of the in put queue of resource I on level 1; $Q_{i,output}^{1}$, or the length of the output queue of resource I on level 1; $L_i^{1}$, or the load upon resource I on level 1; and $D_i^{1}$ or the delay of confirmation that some packet from resource I on level 1 has been served.

An interesting performance measurement in the last category can be referred to as the "BTS round trip delay", which is defined as the time it takes for an access request from a BTS to be confirmed by the BSC via an immediate assignment reply. An example of a BTS round trip delay which can be measured, is illustrated by the diagram shown in FIG. 5. As shown, these delay measurements are available directly only on the BTS level. However, a region-level variant of the BTS round trip delay can be readily obtained in a region level PA, by allowing it to subscribe to the BTS round trip delays from all of its N subordinate PAs, and then forming the average (or weighted sum) of those measurements, as expressed by:

$$D_i^{region} = \frac{\sum_{i=1}^{N} D_i^{cell}}{N}. \quad (2)$$

The derived region level round trip delays can, in turn, be combined in the sub-network PA, in order to form a sub-network relevant round trip delay.

The formula, f, in Equation (1) is then used to weight the different performance inputs (from the PAs) together. The raw performance measurements have a tendency to be noisy. Consequently, it is often necessary to low-pass filter the measurements, or take the average of several consecutive samples in order to obtain a representative performance indicator. This functionality is also included in the formula, f.

The exact load formula to use in practice depends on the control objective, but since many of the listed measurements express roughly the same thing, it is reasonable to simplify the load formula on each level to involve only one type of resource measurement. For example, this is the case where BTS round trip delays are used for measurements at the cell level, while the number of access requests received are used for detecting the region overload as well as the sub-network overload.

In accordance with the preferred embodiment of the present invention, and as shown in the RTCS 14 in FIG. 4, the preferred CA configuration for the BSC overload problem forms a strict hierarchy. The main reason for this arrangement is that all possible settings imposed on the network are truly cell related (e.g., a bar/unbar control command is only valid for a particular cell). This also means that the direct change of a specific network resource parameter can only be ordered from a single agent (CA), which effectively reduces the risk for inconsistencies that would otherwise have been possible should several autonomous CAs have been allowed to do this.

Now, whereas the lower level CAs can issue the control command "bar(class)" or "unbar(class)," where the parameter "class" is a value between 1 and 10, the higher level CAs do not have to bother about these control details (e.g., which class to bar). Instead, the higher level CAs are associated with another set of higher level control commands, such as: (1) external_overload(pace); (2) accept_more_load( ); and (3) coordinated_unbarring (valid) (where "valid" is a boolean value), any of which commands can be passed to a subordinate CA. In the first control command, "pace" means the speed at which it is desired that the load should be decreased. The meanings of the first two control commands are self-explanatory, while the third command is used for synchronization purposes, as will be described in more detail below.

In order to verify that a control command has been accepted, verification messages are passed to the issuer of the command. It is then up to the issuer to take the necessary actions to deal with a no response problem. With this in mind, it is now possible to encapsulate the control logic (control tasks) into the CAs, and provide a complete and robust (at least to some extent) control solution. By robust, it is meant that even if some CAs fail to operate, the rest of the agents will do their work, albeit not as good as before. For example, if a region level CA fails, then its subordinate level CAs will still try to solve any detected overload problem, but now on their own and based solely on the available cell data.

As mentioned earlier, a CA can handle many control tasks, each of which is defined by the priority of the task, the data needed (subscribed to), what external control commands to react to, and last but not least, the control logic. The control logic can be separated into two parts: the control actions (e.g., a control rule, a neural network mapping, etc.); and the sequence (or timing) between these actions.

The sequencing or timing can be specified in a number of different ways. For this embodiment, a technique is employed that uses so-called function charts, typically referred to as the GRAFCET formalism. As such, GRAFCET is an IEC standard for sequential control, it supports high-level hierarchical control design, and by its graphical appearance, it is easy to configure and understand.

Figure 6:
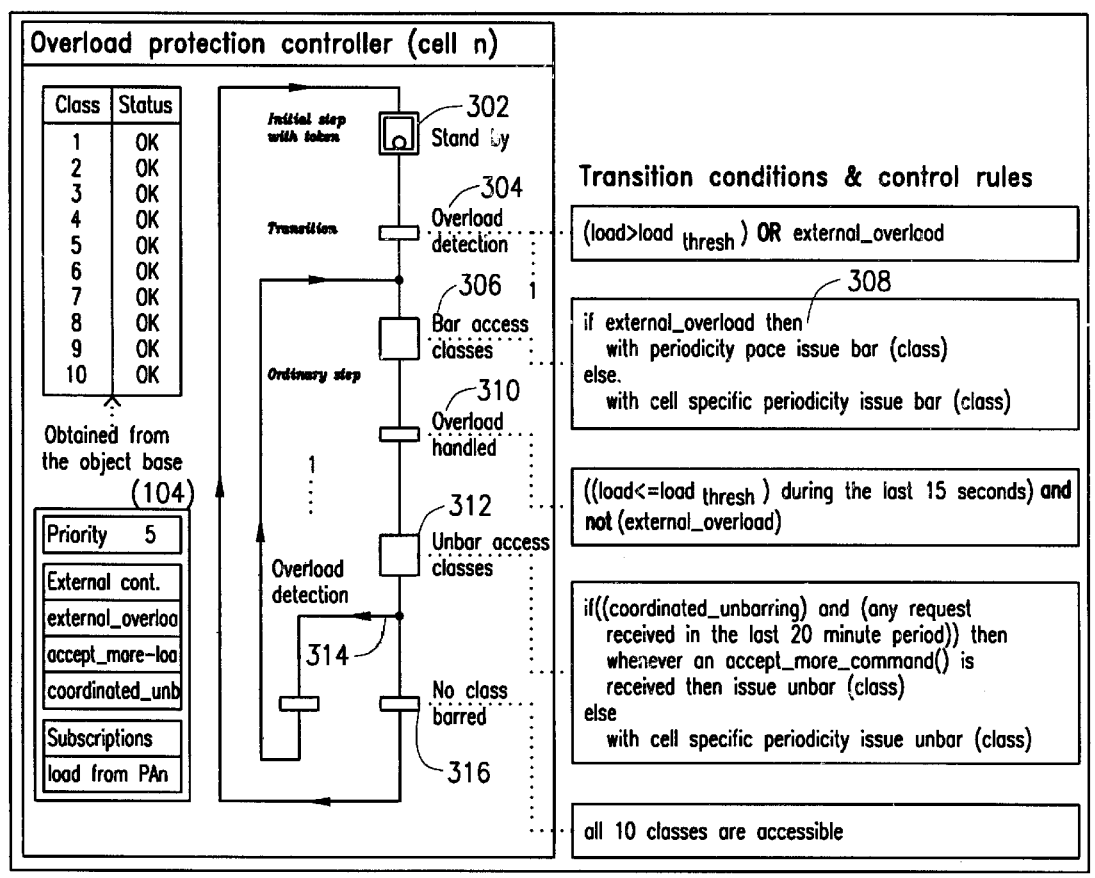
FIG. 6 is a GRAFCET function chart which can be used to implement the preferred embodiment of the present invention.

FIG. 6 is a GRAFCET function chart which can be used to implement the preferred embodiment of the present invention. As shown, a GRAFCET function chart is composed primarily of steps (or states) and transitions, which are interconnected via directed links (unless marked otherwise, the flow is always from top to bottom). The steps can either be active (illustrated by a highlighted dot called a token) or inactive. Any number of control actions can be associated with a step, but these actions are executed only when the step is active. The change from an active to an inactive step is determined by the transition (or, rather the transition condition) located between the steps in question. In addition to steps and transitions, GRAFCET also includes special constructs for repetitions, and alternative paths as well as parallelism.

The simple types of control actions (and transition conditions) originally allowed in the GRAFCET formalism are somewhat restrictive for the applications considered herein. However, in accordance with the present invention, by introducing a rule-based inference engine (a component of the KB 102 shown in FIG. 2) of the type available in conventional knowledge-based systems such as G2, the needed flexibility can be obtained. This flexibility includes event-triggered rules (all transition conditions and some of the control rules are of this type) which are employed to react immediately to changes in one or more inputs, and scanned rules which are used to realize control actions that have to be periodically executed.

At this point, all of the needed control tools for solving the BSC overload problem are available. As such, FIG. 6 depicts a cell level overload protection controller (a control task), or a CA part of the solution to this problem. Note that for this embodiment, there can be equally as many controllers as there are CAs. As such, the logical structure of the different GRAFCET function charts used are more or less the same, regardless of whether the charts are used for cell, region, or sub-network control.

The controller 300 (for cell n) illustrated by FIG. 6 functions as follows. At step 302, the normal mode of operation is to do nothing (stand by). At step 304, when the transition condition of an "Overload detection" is triggered, the step 306 of "Bar access classes" is activated, whereupon the controller orders a barring of access classes. Note that the load information is periodically passed to the CA from the PA which monitors the current cell resource. In this application, it is reasonable to choose a periodicity between 1 and 10 seconds.

At step 306, the periodicity between consecutive barring control commands (i.e., the periodicity of the rule 308 coupled to "Bar access classes") depends on whether the overload is external or local. In order to be able to completely shut down a cell within 3 minutes, the periodicity should be set to less than 20 seconds. As such, in the barring state, the controller 300 orders more and more classes to be barred, and does so until, at step 310, the "Overload handled" transition condition is triggered, which indicates that the problem has been solved. Note that here it can be assumed that the choice of class has already been made from access classes not yet barred, in accordance with a pre-defined policy.

At step 312, an attempt is made to recover the original parameter setting (where all MSs in the cell are allowed to access the network). The unbarring of access classes is either handled locally, or in the case of an external overload, coordinated from a region level CA. Note that as in the barring case, it can be assumed that the choice of the class to unbar has already been settled. If, during this recovery phase, an overload is again detected, barring of access classes will again also be ordered (the repetition branch 314 in FIG. 6 is followed). At step 302, the initial "Stand by" step is activated after the unbarring phase (step 316) has been successfully completed.

As mentioned earlier, a region or sub-network controller is structured similar to a cell level controller. The primary structural difference is that another step is added below the "No class barred" transition, in which a coordinated_unbarring(false) message is issued. The main functional differences appear in the steps "Bar access classes" (renamed to "Reduce region/sub-network load") and "Unbar access classes" (renamed to "Accept more load"). In the former case, a coordinated_unbarring(true) message is first ordered so as to inform the lower level CAs that from now on and until the coordination is reset, the unbarring of access classes is coordinated by a region level CA, whose operations in turn can be coordinated by a sub-network CA. The actual policy for determining how the individual cell level CAs should be coordinated to reduce their respective load, can be arbitrarily complex. For simplicity, the same policy can be applied for all subordinate CAs at the same time, which typically means that the overload is reduced rather quickly. The policy for accepting more load is to repetitively loop through all the subordinate CAs with some periodicity, and at the established point in time, pass an accept_more_command( ) message. This means that only one access class of the managed domain is "opened" at one instant of time, which is an advantageous feature (as described below).

In accordance with the preferred embodiment, the controllers (e.g., 300) involve a number of parameters that must be set appropriately (e.g., the periodicity of reducing the load, the pace of accepting more load, which access class to bar or unbar, etc.). As such, fine tuning these settings in order to improve the system's overall performance is a typical task for the LTRS 16 shown in FIG. 1.

There are three issues related to the performance of the control scheme illustrated by FIG. 6. First, timing and real time computations are important in this application, because being late to detect an overload means that the time to avoid resource restarts is shortened. In order to resolve that problem, a controller (e.g., 300) typically has to bar more MSs (more access classes) than otherwise would have been necessary. More to the point, the longer the delay in introducing effective control, the more bandwidth will be wasted for accesses that cannot meet their timing constraints.

Second, the bar-unbar loop (the repetition loop 314) in FIG. 6 includes hysteresis. The loop where classes are barred and then unbarred takes at least 15 seconds due to the design of the "Overload handled" transition condition. This turns out to be a necessary precaution to impose in order to avoid bar-unbar oscillations caused by noisy measurements. In the end, this also means that the maximum bandwidth needed to pass these control settings is known.

The third observation is that bar-unbar oscillations can readily occur when there is no coordinated unbarring involved. In order to explain this problem, suppose that several cell level CAs in the same region have detected overload and begun to bar access classes in their respective domains. If at roughly the same time, a number of CAs detect that the overload problem has been solved, then they will all order unbarring of access classes in a relatively short time period. The load will then increase (as many MSs attempt to register in the network simultaneously), and there is an imminent risk that this increase will cause another overload situation to occur. By coordinated unbarring, it is possible to control the number of classes being unbarred simultaneously in a previously overloaded region, which means that the risk for bar-unbar oscillations can be significantly reduced.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A real time control system for a distributed communications network, comprising:
    at least one input data link for receiving real time performance data associated with said distributed communications network;
    at least one control agent, for independently analyzing said received real time performance data and accordingly outputting commands to control performance of said distributed communications network; and
    at least one output data link for controlling the performance of said distributed communications network based on said real time performance data.

2. The real time control system of claim 1, wherein said at least one control agent includes means for controlling a plurality of resources in said distributed communications network.

3. The real time control system of claim 2, wherein said plurality of resources comprises a plurality of resources managed by a Base Station Controller.

4. The real time control system of claim 3, wherein said plurality of resources managed by said Base Station Controller has experienced overload.

5. The real time control system of claim 4, wherein said at least one control agent includes means for controlling said performance of said plurality of managed resources to eliminate said overload.

6. The real time control system of claim 5, wherein said performance of said plurality of managed resources includes a measurement of Base Transceiver Station round trip delay.

7. The real time control system of claim 5, wherein said performance of said plurality of managed resources includes a measurement of Base Station Controller central processor CPU load.

8. The real time control system of claim 5, wherein said performance of said plurality of managed resources includes a measurement of Base Station Controller central processor queue lengths.

9. The real time control system of claim 5, wherein said performance of said plurality of managed resources includes a measurement of a number of access requests received at said Base Station Controller.

10. The real time control system of claim 5, wherein said performance of said plurality of managed resources includes a measurement of Transceiver Handler queue lengths.

11. The real time control system of claim 5, wherein said performance of said plurality of managed resources includes a measurement of a number of access requests received at a Transceiver Handler.

12. The real time control system of claim 5, wherein said performance of said plurality of managed resources includes a measurement of Base Transceiver Station queue lengths.

13. The real time control system of claim 5, wherein said performance of said plurality of managed resources includes an average of a plurality of Base Transceiver Station round trip delay measurements.

14. The real time control system of claim 5, wherein said performance of said plurality of managed resources includes a measurement of a number of access requests received at a Base Transceiver Station.

15. The real time control system of claim 2, wherein control signals generated by said at least one control agent are dependent on measured data and a certainty factor for said measured data.

16. The real time control system of claim 2, wherein control signals for controlling a plurality of resources are synchronized throughout said distributed communications network.

17. The real time control system of claim 2, wherein said plurality of resources comprises a plurality of resources managed by a switching system.

18. The real time control system of claim 1, wherein said at least one control agent instead comprises a plurality of control agents connected hierarchically.

19. The real time control system of claim 18, wherein individual control agents of said plurality of control agents encapsulate detailed control logic and abstract said encapsulated detailed control logic for use by other control agents.

20. The real time control system of claim 1, wherein a control agent communicates with a plurality of other control agents.

21. The real time control system of claim 20, wherein said control agents are connected in a hierarchical manner.

22. The real time control system of claim 1, wherein said distributed communications network comprises an Internet.

23. The real time control system of claim 22, wherein said at least one control agent includes means for controlling a plurality of resources managed by a router in said Internet.

24. The real time control system of claim 1, further comprising at least one input control connection for receiving control signals associated with a long term performance of said distributed communications network.

25. The real time control system of claim 1, wherein said at least one control agent comprises:
   means for storing information associated with at least one control application to be performed by said at least one control agent;
   means for storing configuration, state and performance information associated with said distributed communications network;
   means for generating subscription information for use in making performance measurements in said distributed communications network, and for receiving real time performance event information associated with said distributed communications network; and
   means, coupled to said means for storing, generating and receiving, for scheduling at least one function to meet at least one timing constraint.

26. The real time control system of claim 1, wherein said distributed communications network comprises a cellular network.

27. The real time control system of claim 1, wherein said distributed communications network comprises a data communications network.

28. The real time control system of claim 1, wherein said distributed communications network comprises a telecommunications network.

29. A method for eliminating overload in a cellular network, comprising the steps of:
   detecting an overload in a managed resource in said cellular network;
   responsive to said step of detecting, ordering a barring of mobile access classes for said managed resource;
   monitoring a load in said managed resource; and
   if said overload is handled within a predetermined time interval, ordering an unbarring of said mobile access classes.

30. The method of claim 29, wherein said managed resource comprises at least one cell as defined by at least one Base Transceiver Station.

31. The method of claim 30, wherein said steps are performed by an overload protection controller.

32. The method of claim 29, wherein said mobile access classes comprise a plurality of mobile stations requesting access to said cellular network.

33. The method of claim 29, wherein an oscillation between said barring step and said unbarring step is dampened by the steps of:
   introducing hysteresis; and
   coordinating said unbarring of said mobile access classes.

34. A control agent for controlling the performance of a distributed communications network, comprising:
   a subscription and event handler for generating subscription information for use in making performance measurements in said distributed communications network, and for receiving real time performance event information associated with said distributed communications network;
   a knowledge base for storing information associated with at least one control application to be performed by the control agent;
   an object base for storing configuration, state and performance information associated with said distributed communications network; and
   a scheduler, coupled to said subscription and event handler, said knowledge base, and said object base, for scheduling at least one function to meet at least one timing constraint.

35. The control agent of claim 34, wherein said real time performance event information is received from at least one performance agent.

36. The control agent of claim 35, wherein said real time performance event information comprises Base Transceiver Station round trip delay measurement information.

37. A method for controlling the performance of a distributed communications network in real time, comprising the steps of:

a control agent receiving and independently analyzing real time performance data associated with said distributed communications network; and said control agent outputting at least one control command for controlling the performance of said distributed communications network based on said received real time performance data.

38. The method of claim 37, further comprising the steps of:

receiving control commands associated with a long term performance of said distributed communications network; and said control agent outputting at least one control command for controlling the performance of said distributed communications network based on said received long term control commands.

39. The method of claim 37, further comprising the steps of:

storing information associated with at least one control application to be performed by said at least one control agent;

storing configuration and state information, and said real time performance data associated with said distributed communications network;

generating subscription information for use in making performance measurements in said distributed communications network; and scheduling at least one of the storing and generating steps in order to meet at least one timing constraint.

40. A method for eliminating overload in a distributed communications network, comprising the steps of:

detecting an overload in a managed resource in said distributed communications network;

responsive to said step of detecting, ordering a reduction of a load for said managed resource;

monitoring said load in said managed resource; and if said overload is handled within a predetermined time interval, allowing an increase of said load.

41. The method of claim 40, wherein said distributed communications network comprises a cellular network.

42. A distributed communications network management and control system, comprising:

a real time performance management system, said real time performance management system including at least one performance agent comprising means for processing, analyzing and abstracting real time performance data captured from a traffic device; and a real time control system, said real time control system including at least one control agent comprising means for receiving said real time performance data from said at least one performance agent and independently controlling the performance of said distributed communications network based on said received real time performance data.

* * * * *

UNITED STATES PATENT AND TRADEMARK OFFICE
CERTIFICATE OF CORRECTION

PATENT NO. : 6,370,572 B1  
DATED : April 9, 2002  
INVENTOR(S) : Lindskog et al.

Page 1 of 1

It is certified that error appears in the above-identified patent and that said Letters Patent is hereby corrected as shown below:

<u>Column 12,</u>  
Line 64, replace

" $load_i^l = f(M_i^l, Q_{i,input}^l, Q_{i,output}^l, L_i^l, D), (1)$ "

with

-- $load_i^l = f(M_i^l, Q_{i,input}^l, Q_{i,output}^l, L_i^l, D_i^l), (1)$ --

Signed and Sealed this

First Day of October, 2002

*Attest:*

*Attesting Officer*

JAMES E. ROGAN  
*Director of the United States Patent and Trademark Office*